United States Patent [19]
Kleiner et al.

[11] 3,914,345
[45] Oct. 21, 1975

[54] PROCESS FOR THE MANUFACTURE OF DIALKYL-PHOSPHINIC ACID ESTERS

[75] Inventors: Hans-Jerg Kleiner, Bad Soden; Franz Landauer, Frankfurt am Main, both of Germany

[73] Assignee: Hoechst Aktiengesellschaft, Frankfurt am Main, Germany

[22] Filed: Dec. 21, 1973

[21] Appl. No.: 427,253

Related U.S. Application Data

[63] Continuation-in-part of Ser. No. 215,900, Jan. 6, 1972, abandoned.

[30] Foreign Application Priority Data

Jan. 8, 1971    Germany............................ 2100779

[52] U.S. Cl............... 260/970; 204/162 R; 260/962

[51] Int. Cl.$^2$........................................... C07F 9/32
[58] Field of Search.................. 260/970; 204/162 R

[56] References Cited
UNITED STATES PATENTS
3,029,272    4/1962    Runge................................ 260/970

*Primary Examiner*—Richard L. Raymond
*Attorney, Agent, or Firm*—Curtis, Morris & Safford

[57]          ABSTRACT

Dialkyl-phosphinic acid alkyl esters are obtained by reacting α-monoolefins being substantially free of sulfur compounds with dialkyl-phosphites in the presence of free-radical generators. The known products are foam depressants, flame retardant agents and intermediates for plant protecting agents.

9 Claims, No Drawings

PROCESS FOR THE MANUFACTURE OF DIALKYL-PHOSPHINIC ACID ESTERS

This is a continuation-in-part application of application Ser. No. 215,900, filed Jan. 6, 1972, now abandoned.

The present invention relates to an improved process for the preparation of dialkyl-phosphinic acid alkyl esters.

In the copending application Ser. No. 98,052 filed Dec. 14, 1970 by Hans-Jerg Kleiner and Siegbert Rittner, Pat. No. 3,812,222, there is described and claimed a process for the preparation of a compound of the formula

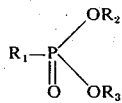

in which $R_1$ is alkyl of 2 to 22 carbon atoms and $R_2$ and $R_3$ are alkyl of 1 to 22 carbon atoms from a dialkyl-phosphite of the formula

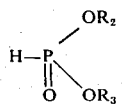

in which $R_2$ and $R_3$ are as defined above, and an α-monoalkene of 2 to 22 carbon atoms in the presence of a free-radical generator comprising reacting α-monoalkenes of 2 to 22 carbon atoms containing less than about 0.002 % by weight of organically linked sulfur with said dialkyl-phosphites at a temperature of about 130° to about 250°C.

Now we have found that also the corresponding dialkyl-phosphinic acid alkyl esters of the general formula

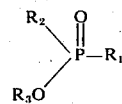

in which $R_1$ represents an alkyl group having 2 to 22 carbon atoms and $R_2$ and $R_3$ represent alkyl groups having 1 to 22 carbon atoms, can be prepared be reacting alkane-phosphonous acid alkyl esters of the general formula

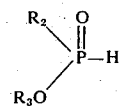 (II)

according to the process of the invention, with α-olefins having 2 to 22 carbon atoms.

The reaction according to the invention gives a high yield. This is surprising, because it has hitherto been known that phosphonous acid esters add, in the presence of peroxidic catalysts, onto α-olefins in small yields only (Houben-Weyl, Methoden der organischen Chemie, Band 12/1, Georg Thieme Verlag, Stuttgart 1963, page 258).

As phosphonous acid alkyl esters there may be mentioned, for example methane-phosphonous acid methyl-ester, methane-phosphonous acid ethyl-ester, methane-phosphonous acid propyl ester, methane-phosphonous acid-isopropyl-ester, methane-phosphonous acid butyl-ester, methane-phosphonous acid isobutyl-ester, methane-phosphonous acid octyl-ester, methane-phosphonous acid-2-ethylhexyl-ester, methane-phosphonous acid-dodecyl ester, propane-phosphonous acid-eikosyl-ester, octane-phosphonous acid-ethyl ester, dodecane-phosphonous acid-butyl ester, eikosane-phosphonous acid-propyl ester.

Those of the phosphonous acid esters of the formula II are preferred in which $R_2$ stands for alkyl groups having 1 to 14 carbon atoms, in particular the methyl group, and $R_3$ stands for alkyl groups having 1 to 8 carbon atoms, in particular those having 1 to 4 carbon atoms. Of the α-olefins used, those are preferred which contain 2 - 16 carbon atoms, in particular 2 or 3 carbon atoms.

The α-olefins used in the process of the invention contain from 2 to 22 carbon atoms, preferably from 2 to 12 carbon atoms. In the process of the invention, besides straight-chain α-mono-olefins also branched α-mono-olefins may be used. Examples of such olefins are: ethylene, propene, butene-(1), hexene-(1), octene-(1), dodecene-(1), tetradecene-(1), hexadecene-(1), octadecene-(1), heneicosene-(1), docosene-(1), 2-methyl-pentene(1) and 2-ethyl-hexene-(1). Also mixtures of such olefins may be used.

As decisive criterion for a success of the process of the invention it is required that the α-mono-olefin to be used must be substantially free or at least nearly free of organically linked sulfur, i.e. the sulfur content of the distilled α-mono-olefin must be below 0.002 % by weight, for, as surprisingly was found out, organically linked sulfur amounts of only about 0.02 % by weight result in considerably lower yields.

Especially ethylene and propylene have to be sulfur-free or nearly sulfur-free. Advantageously, they are used in a purity degree as required for a successful polymerization according to the known Ziegler process in which for instance the overall sulfur content of ethylene should be at most 3 ppm by weight.

Advantageously, those higher olefins are used in the process of the invention which are free of organically linked sulfur from the start on account of their manufacturing process. Such a process is for example the so-called Ziegler or Mülheim process, in which ethylene is dimerized or oligomerized into straight-chain α-olefins in the presence of catalysts, especially aluminum triethyl. According to the same process, also branched α-olefins, for example 2-methyl-pentene-(1) and 2-ethyl-hexene-(1) may be prepared, by dimerization, for example, of propene or isobutylene (cf. F. Asinger, Chemie und Technologie der Monoolefine, Akademie-Verlag, Berlin 1957, especially pages 178 – 180). The dimerization may be also carried out in a different manner, for example by catalysis by means of alkali metals. Of course, also such α-olefins may be used as starting compounds which are obtained in other known processes, for example by cracking of petroleum distillates or waxes, by splitting off hydrochloric acid from paraffins with terminal chlorine atoms or by dehydration of alcohols with a terminal hydroxy group. The only important factor is their being free of organically linked sulfur or substantially sulfur-free. Otherwise, the organically linked sulfur has to be eliminated completely or nearly completely by means of appropriate measures, for example by catalytic de-sulfuration.

α-Olefins obtained by cracking of petroleum and subsequent fractionated distillation, may contain considerable amounts of organically linked sulfur. Elementary sulfur in a crude cracking product, if any, remains in the distillation residue after the distillation. Elementary sulfur in only very seldom found in petroleum and, if so, only in traces. The major portion of sulfur found in petroleum is in the form of organic sulfur compounds. This sulfur content is a very important characteristic, especially with regard to the processing of petroleum (cf. Winnacker-Küchler, Chemische Technologie Band 3, Carl Hanser Verlag, Munich 1959, page 189 – 190 and 195).

As free radical forming agents in the process of the invention all known radical forming substances may be used, for example: di-tert.-butylperoxide, tert.-butylperbenzoate, 2,5-dimethyl-bis-2,5-(peroxybenzoate), tert.-butylhydroperoxide, di-cumylperoxide and benzoylperoxide.

The radical forming agents are dissolved in the reaction component(s) which is (are) introduced dropwise into the reaction vessel. It may be necessary to add an inert solvent as dissolving agent; for example in the case of dodecene-(1) being added dropwise to a dialkyl-phosphite and benzoyl-peroxide being used as radical forming agent, a dissolving agent has to be used, since benzoylperoxide is not sufficiently soluble in dodecene-(1). In this special case, benzene may be used as inert solvent.

The radical forming agent may also be insoluble in the olefin but soluble in the dialkyl-phosphite. In this case that part of the total dialkyl-phosphite, in which the radical forming agent is dissolved may be introduced separately besides the olefin. Further, also the dialkyl-phosphite may possibly be used as solution promoter for the radical forming agent in the olefin.

The radical forming agents are used in catalytic amounts, advantageously of from 0.1 to 2 mol %, preferably of from 0.5 to 1.2 mol %, calculated on the amount of olefin used. Advantageously, di-tert.-butylperoxide is used.

In case the reaction is started by ultraviolet radiation, the reaction solution has to be exposed to direct radiation by an ultraviolet lamp.

The reaction with gaseous olefins according to the invention is advantageously carried out as follows: the olefin is fed, while stirring vigorously, into the dialkyl-phosphite at the same rate as it is absorbed. Advantageously, dialkyl-phosphite and olefin are used in a molar ratio of about 1 : 1. It is also possible to use an excess of one of the reaction components, but there is no advantage in doing so. It is not necessary to use pressure.

The reaction according to the invention with liquid olefins is advantageously carried out as follows: The olefin, optionally mixed with catalytic amounts of a radical forming agent, is introduced dropwise into the dialkyl-phosphite; lower boiling olefins being advantageously added dropwise in such a manner that the outlet tube of the dropping funnel ends below the surface of the dialkyl-phosphite. Advantageously, dialkyl-phosphite and olefin are used in a molar ratio of about 1 : 1. It is also possible to use an excess of one of the reaction components, but there is generally no advantage in doing so when using radical forming agents. Only in case the reaction is carried out by means of ultraviolet radiation, an excess of dialkyl-phosphite is advantageous in a molar ratio of 2 - 3 mols of dialkyl-phosphite to about 1 mol of olefin.

The reaction may also be carried out in the presence of inert solvents, for example of alcohols, esters or hydrocarbons, such as benzene. However, generally it is advantageous to work in the absence of solvents.

The reaction may also be carried out in an inert gas atmosphere, using for example argon or nitrogen. Also the olefin used in the reaction may serve as protective gas in case it is present in its gaseous form under the reaction conditions.

The reaction time of the process of the invention is considerably shorter than that of the known processes, i.e. generally from about 1 to 3 hours, in most cases from about 1 to 2 hours. Only when using ultraviolet radiation, it is advantageous to extend the reaction time to 5 to 8 hours in order to obtain high yields.

The reaction proceeds practically quantitatively. The dialkyl-phosphinic acid esters can be purified in the usual manner, for example by distillation.

The process can also be carried out in continuous manner. The dialkyl-phosphinic acid esters obtained according to the process of the invention are intermediate products which are very important in industrial and economical view for plant protecting agents. Furthermore, they can be used as foam depressants and flame retardant agents.

The process of the invention permits the preparation of dialkyl-phosphinic acid esters in a simple manner with very good yields and, therefore, represents a great advance in the industrial art.

The following Examples illustrate the invention.

EXAMPLE 1

Ethylene was introduced, under an atmosphere of nitrogen, at 160° – 170° C, for 2 hours, while stirring vigorously, to such extent into 300 6 of methane-phosphonous acid isobutyl ester as it was fixed, while dropping in a mixture of 30 g of methane-phosphonous acid-isobutyl ester and 3 g of di-tert.butyl-peroxide. The whole was then distilled. 390 g of methyl-ethyl-phosphinic acid isobutyl ester were obtained. Boiling point (0.7 mm Hg) 62°C. This corresponded to a yield of 98 % of the theory.

EXAMPLE 2

155.5 g of dodecene-(1), mixed with 2 g of di-tert.butyl-peroxide, were added dropwise, within 2 hours, while stirring vigorously, under an atmosphere of nitrogen, to 100 g of methane-phosphonous acid ethyl ester, at 150° C. Then, distillation was carried out. 230 g of methyl-dodecyl-phosphinic acid ethyl ester were obtained. Boiling point (0.1 mm Hg) 145° C, melting point 30° – 33° C. This corresponded to a yield of 90% of the theory.

EXAMPLE 3

96.5 g of dodecene-(1), mixed with 1 g of di-tert.butyl-peroxide, were added dropwise within 1 hour, at 150° C, while stirring vigorously, to 70 g of methane-phosphonous acid-n-propyl ester. Then, distillation was carried out. 155 g of methyl-dodecyl-phosphinic acid propyl ester were obtained. Boiling point (0.9 mm Hg)

EXAMPLE 4

168 g of dodecene-(1), mixed with 2 g of di-tert.butyl-peroxide, were added dropwise, while stirring vigourously, within 1.5 hours, at 150° C, to 136 g of methane-phosphonous acid-isobutyl ester under an atmosphere of nitrogen. Then, distillation was carried out. 289 g of methyl-dodecyl-phosphinic acid isobutyl ester were obtained. Boiling point (0.4 mm Hg) 153° C. This corresponded to a yield of 95% of the theory.

In the same manner, there was obtained, when using the methane-phosphonous acid-n-butyl ester, the methyl-dodecyl-phosphinic acid-n-butyl ester in a yield of 93%. Boiling point (0.6 mm Hg) 165° C.

When using tetradecene-(1), there was obtained in the same manner the methyl-tetradecyl-phosphinic acid-isobutyl ester in a yield of 88.5 %. Boiling point (0.4 mm Hg) 175° C.

EXAMPLE 5

70 g of octene-(1), mixed with 1 g of di-tert.butyl-peroxide, were added dropwise, while stirring vigourously, within 1 hour, at 150° C, to 120 g of methane-phosphonous acid-n-octyl ester under an atmosphere of nitrogen in such a manner that the outlet tube of the dropping funnel was under the surface of the reaction mixture. When the reaction was completed, distillation was carried out. 162 g of methyl-octyl-phosphinic acid-n-octyl ester were obtained. Boiling point (0.2 mm Hg) 141° C. This corresponded to a yield of 85% of the theory.

EXAMPLE 6

66.5 of hexadecene-(1), mixed with 0.3 g of di-tert.butyl-peroxide, were added dropwise, while stirring vigourously, within 50 minutes, to 57 g of methane-phosphonous acid-2-ethyl-hexylester at 150° C. The whole was stirred for 10 minutes. Then, distillation was carried out to an internal temperature of 185° C at 0.1 torr. The residue was 115 g. It constituted pure methylhexadecyl-phosphinic acid-2-ethyl-hexyl ester. This corresponded to 93 % of the theory.

EXAMPLE 7

400 g of methane-phosphonous acid-isobutyl ester were heated to 150° C and then 411 g of decene-(1) and 3 g of di-tert.butyl-peroxide were added dropwise, in the course of 3 hours, while stirring vigourously, at 150° C. Then, distillation was carried out. 782 g of methyl-decyl-phosphinic acid-isobutyl ester were obtained. Boiling point (0.5 mm Hg) 138° C. This corresponded to a yield of 96.5 % of the theory.

EXAMPLE 8

Propylene was introduced into 400 g of methane-phosphonous acide isobutyl ester under an atmosphere of nitrogen, at 160°–170° C, while stirring vigourously, within 2 hours, to the extent as it was adding, while dropping-in a mixture of 40 g of methane-phosphonous acid-isobutyl ester and 5 g of di-tert.butyl-peroxide. After completion of the reaction, 565 g of methyl-propyl-phosphinic acid isobutyl ester were obtained. According to gas-chromatography, the compound was found to have a purity of 88.5 %.

EXAMPLE 9

Butene-(1) was introduced, while stirring vigourously, within 2 hours, at 170° C, into 350 g of methane-phosphonous acid-isobutyl ester under an atmosphere of nitrogen, at 170° C, to the extent as it was adding, while dropping-in into the mixture a mixture of 40 g of methane-phosphonous acid-isobutyl-butyl ester and 35 g of di-tert.butyl-oxide. When the reaction was completed, distillation was effected. 480 g of methylbutyl-phosphinic acid isobutyl ester were obtained. Boiling point (1.0) mm Hg) 82° C. This corresponded to a yield of 87.5% of the theory.

EXAMPLE 10

Isobutylene was introduced at 170° C, for several hours, while stirring vigourously, into 350 g of methane-phosphonous acid-isobutyl ester under an atmosphere of nitrogen to the extent as it was adding, while dropping-in a mixture of 40 g of methane-phosphonous acid isobutyl ester and 2.5 g of di-tert.butyl-peroxide. When the reaction was completed, distillation was carried out. 450 g of methyl-isobutyl-phosphinic acid-isobutyl ester were obtained. Boiling point (0.2 mm Hg) 66° C. This corresponded to a yield of 82 % of the theory.

EXAMPLE 11

216 g of 4-methylpentene-(1), mixed with 2.5 g of di-tert.butyl-peroxide, were added dropwise within 1 hour, at 170° C, while stirring vigourously, to 350 g of methane-phosphonous acid-isobutyl ester in such a manner that the outlet tube of the dropping funnel led below the surface of the reaction mixture. Then distillation was carried out. 520 g of methyl-4-methyl-pentyl-phosphinic acid-isobutyl ester were obtained. Boiling point (0.2 mm Hg) 90° – 92° C. This corresponded to a yield of 92% of the theory.

EXAMPLE 12

216 g of hexene-(1), mixed with 2.5 g of di-tert.butylperoxide, were added dropwise, within 1 hour, at 170° C, while stirring vigourously, to 350 g of methane-phosphonous acid-isobutyl ester in such a manner that the outlet tube of the dropping funnel was below the surface of the reaction mixture. Then distillation was carried out. 510 g of methyl-hexyl-phosphinic acid-isobutyl ester were obtained. Boiling point (0.24 mm Hg) 89° C. This corresponded to a yield of 90% of the theory.

EXAMPLE 13

288 g of octene-(1), mixed with 2.5 g of di-tert.butyl-peroxide, were added dropwise in the course of 1½ hours, at 170° C, while stirring vigourously, to 350 g of methane-phosphonous acid-isobutyl ester in such a manner that the outlet tube of the dropping funnel was located below the surface of the reaction mixture. Upon the following distillation, 622 g of methyl-octyl-phosphinic acid -isobutyl ester were obtained. Boiling point (0.5 mm Hg) 118° C. This corresponded to a yield of 97.5 % of the theory.

EXAMPLE 14

350 g of methane-phosphonous acid-isobtyl ester were heated under an atmosphere of nitrogen to 160° – 170° C. A mixture of 288 g of 2,4,4-trimethylpentene- (1) and 3 g of di-tert.butyl-peroxide was added dropwise within 5 hours at this temperature in such a manner that the outlet tube of the dropping funnel was located below the surface of the reaction mixture. When the reaction was completed, distillation was carried out. 512 g of 2,4,4-trimethyl-pentyl-methyl-phosphinic acid-isobutyl ester were obtained. Boiling point (0.6 mm Hg) 100° C. This corresponded to a yield of 80% of the theory.

We claim:

1. A process for the preparation of a compound of the formula

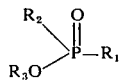

in which $R_1$ is alkyl of 2 to 22 carbon atoms and $R_2$ and $R_3$ are alkyl of 1 to 22 carbon atoms, which comprises reacting a phosphonous acid ester of the formula

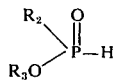

in which $R_2$ and $R_3$ are defined as above, with an α-monoalkene of 2 to 22 carbon atoms containing less than 0.002 % by weight of organically linked sulfur in the presence of a free radical generator at a temperature of 130° to 250°C.

2. The process as claimed in claim 1, wherein the temperature is from 150° to 195°C.

3. The process as claimed in claim 1, wherein the free radical generator is a peroxide or UV light irradiation.

4. The process as claimed in claim 1, wherein the free radical generator is an organic peroxide.

5. The process as claimed in claim 1, wherein the free radical generator is di-tert.-butyl peroxide.

6. The process as claimed in claim 1, wherein the α-monoalkene has 2 to 16 carbon atoms.

7. The process as claimed in claim 1, wherein the phosphonous acid ester is a methane phosphonous acid alkyl ester having 1 to 8 carbon atoms in the alkyl moiety.

8. The process as claimed in claim 1, wherein about stoichiometrical amounts of phosphonous acid ester and alkene are used.

9. The process as claimed in claim 1, wherein the free radical generator is an organic peroxide which is used in a molar amount of 0.1 to 2 %, referred to alkene.

* * * * *